US012547165B2

(12) United States Patent
Guo et al.

(10) Patent No.: US 12,547,165 B2
(45) Date of Patent: Feb. 10, 2026

(54) PREDICTIVE SYSTEM MAINTENANCE MODEL BASED ON MACHINE LEARNING (71) Applicant: SAP SE, Walldorf (DE)

(72) Inventors: Jing Guo, Xi'an (CN); Zhou Yang, Xi'an (CN); Yuanyang Wang, Xi'an (CN); Jing-tao Li, Xi'an (CN)

(73) Assignee: SAP SE, Walldorf (DE)

( * ) Notice: Subject to any disclaimer, the term of this patent is extended or adjusted under 35 U.S.C. 154(b) by 491 days.

(21) Appl. No.: 18/133,120

(22) Filed: Apr. 11, 2023

(65) Prior Publication Data
US 2024/0345574 A1 Oct. 17, 2024

(51) Int. Cl.
G06F 8/35 (2018.01)
G05B 23/02 (2006.01)

(52) U.S. Cl.
CPC .................. G05B 23/0283 (2013.01)

(58) Field of Classification Search
CPC ....................................................... G06F 8/35
See application file for complete search history.

(56) References Cited

U.S. PATENT DOCUMENTS 11,531,694 B1 * 12/2022 Barrientos ............ G06N 3/0442
2020/0398423 A1 * 12/2020 Hane ...................... B25J 13/085

FOREIGN PATENT DOCUMENTS

CN 118646642 A * 9/2024 ............ H04L 41/147
CN 118779608 A * 10/2024 ............. G06Q 50/02

* cited by examiner

Primary Examiner — Jae U Jeon
(74) Attorney, Agent, or Firm — SCHWEGMAN LUNDBERG & WOESSNER, P.A.

(57) ABSTRACT

In an example embodiment, a predictive system maintenance module is created based on machine learning. The predictive system maintenance module achieves an improvement in predicting condition-based maintenance decision-making through a cloud-based approach, using a wide variety of information. Factors that influence downtime loss are identified and a generalized loss function, known as the downtime loss function, is defined. A prediction model is then built based on a multi-step forecasting time series model. The prediction model is then used to forecast a window that minimizes downtime loss. The predictive maintenance module uses historical data to foresee when and how to implement the seamless upgrading at a proper time so that it could have minimum downtime loss on the customer.

20 Claims, 8 Drawing Sheets

PREDICTIVE SYSTEM MAINTENANCE MODEL BASED ON MACHINE LEARNING

TECHNICAL FIELD

This document generally relates to computer software application development. More specifically, this document relates to use of a composable processing framework based on a web assembly component model.

BACKGROUND

Patching, upgrading, and maintaining services on a cloud platform is a growing management complexity problem that can result in unacceptable system downtime. More particularly, when patching, upgrade, or maintaining services on a cloud platform it is common for such actions to result in the service being down or otherwise unusable/unreachable by customers for some period of time. While improvements have been made in the amount of downtime caused by patch, upgrade, or maintenance functions, there have not been many improvements in reducing the impact of downtime on the customers.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Solutions for performing patches, upgrades, or other maintenance on cloud services can include rolling upgrades or high available upgrades. Rolling upgrades involve gradually updating the service in small increments, with each increment being tested and validated before moving on to the next. The basic idea behind rolling upgrades is to avoid deploying changes to an entire cloud service all at once. Instead, a small portion of the service is updated at a time, while the rest of the service continues to run in its current state. This approach allows for quick rollbacks if there are any issues or errors that are discovered during the deployment process. High availability upgrades aim to minimize the downtime of the service. High available upgrade techniques include:

Blue-green deployment: In this approach, two identical environments (blue and green) are maintained, with only one environment serving production traffic at any given time. The updates are first deployed to the non-production environment (blue), which is then validated and tested before being switched to serve production traffic. This ensures that the production environment (green) is always available during the update process, and if any issues arise, traffic can be quickly switched back to the previous environment.

Canary deployment: In this approach, a small percentage of traffic is routed to the updated version of the service, while the rest of the traffic continues to be served by the current version. This allows for testing and validation of the updated version with real traffic, while minimizing the impact on end-users. If any issues arise, the traffic can be quickly reverted to the previous version.

Rolling upgrades with redundant instances: This approach involves deploying redundant instances of the service in separate availability zones or regions. Updates are deployed to one instance at a time, while the others continue to serve traffic. This allows for a gradual rollout of updates, with minimal impact on end-users.

These are technical issues, however, with these types of deployments. They cannot implement certain types of changes that require modifications to persistent data structures on disk. Additionally, zero-downtime upgrades are prone to failure because they place the system in a state with mixed versions, which increases the risk of breaking hidden dependencies during the upgrades. Such broken dependencies represent the leading cause of unplanned downtime resulting from software upgrades.

In an example embodiment, rather than focus on trying to reduce or eliminate the amount of downtime, the focus is shifted to determining the best date and time to perform the upgrade/patch/maintenance that causes the least impact on the customer from the downtime (called the "downtime loss"). One possibility would be for the customer to set the desired date/time for the downtime. This, however, will not work in a large percentage of cases because customers often have difficulty predicting when their downtime loss will be minimized.

In an example embodiment, a predictive system maintenance module is created based on machine learning. The predictive system maintenance module achieves an improvement in predicting condition-based maintenance decision-making through a cloud-based approach, using a wide variety of information. Factors that influence downtime loss are identified and a generalized loss function, known as the downtime loss function, is defined. A prediction model is then built based on a multi-step forecasting time series model. The prediction model is then used to forecast a window that minimizes downtime loss. The predictive maintenance module uses historical data to foresee when and how to implement the seamless upgrading at a proper time so that it could have minimum downtime loss on the customer.

Service downtime on a cloud platform affects any business that uses the service in some capacity to operate. The accuracy of quantization about downtime loss determines whether the predictive upgrading strategy is effective, so quantifying the downtime loss is useful in building a downtime loss prediction model.

There are many factors that can affect downtime loss. For the services on a cloud platform that require necessary downtime for service upgrades, in addition to the upgrade downtime period and job restart period, factors such as workload at the infrastructure, user connection, and application levels can be considered.

The workload of the infrastructure level indicates generally how "busy" the infrastructure is. Specifically, this can include information such as the processor usage rate of the server (cluster/instance) node, the network input/output (I/O) rate, and the memory usage rate. The high workload of the server is usually due to many customized jobs or a large amount of data processing and transmission. Upgrading during this period is likely to cause many data processes to be interrupted, which can result in significant downtime loss.

The workload of the user connection indicates, at the platform level, the number of user connections in each region, especially the number of long connections (the connections that have been on awhile) and the number of talents. Upgrading with large amounts of user connections is likely to cause many user connections to be interrupted, which results in significant downtime loss.

The workload at the application level indicates generally how "busy" the application is. Specifically, this can include factors such as quality of service (QoS) or response delay. Upgrading during a bad QoS period is likely to cause worse user experiences and long response delay, which results in significant downtime loss.

A generalizable loss function, called Downtime Loss Function, can be defined as follows: $y=f(x1, x2, c3, \ldots )$, where y is downtime loss, $f(x)$ is the downtime loss function, and x1, c2, x3, etc. are the factors that affect downtime loss. When defining the downtime loss function, it should be noted that the downtime loss function need not be fixed; it can evolve with iterations of a service version.

It should also be noted that in some example embodiments, the downtime loss function can be dynamically customized based on user, and more particularly based on user type. The diversity of users becomes more prominent with increasing users. Different user types can correspond to different downtime loss functions, which makes the maintenance window prediction more reliable. As such, in these example embodiments, the downtime loss function can be rewritten as $y=f1 (u, x1, x2, x3, \ldots )$ u=type 1 user; $y=f2 (u, x1, x2, x3, \ldots )$ u=type 2 user; $y=f3 (u, x1, x2, x3, \ldots )$ u=type 3 user, and so on.

Each factor may be passed to a feature analyze layer, which may perform some transformation and/or calculation on the factor, output the result of the transformation and/or calculation, and apply a weight to the output. The downtime loss function can then combine these transformation/calculations (after the weights have been applied to (e.g., multiplied by) each transformation/calculation to produce a single downtime loss function output.

Figure 1:
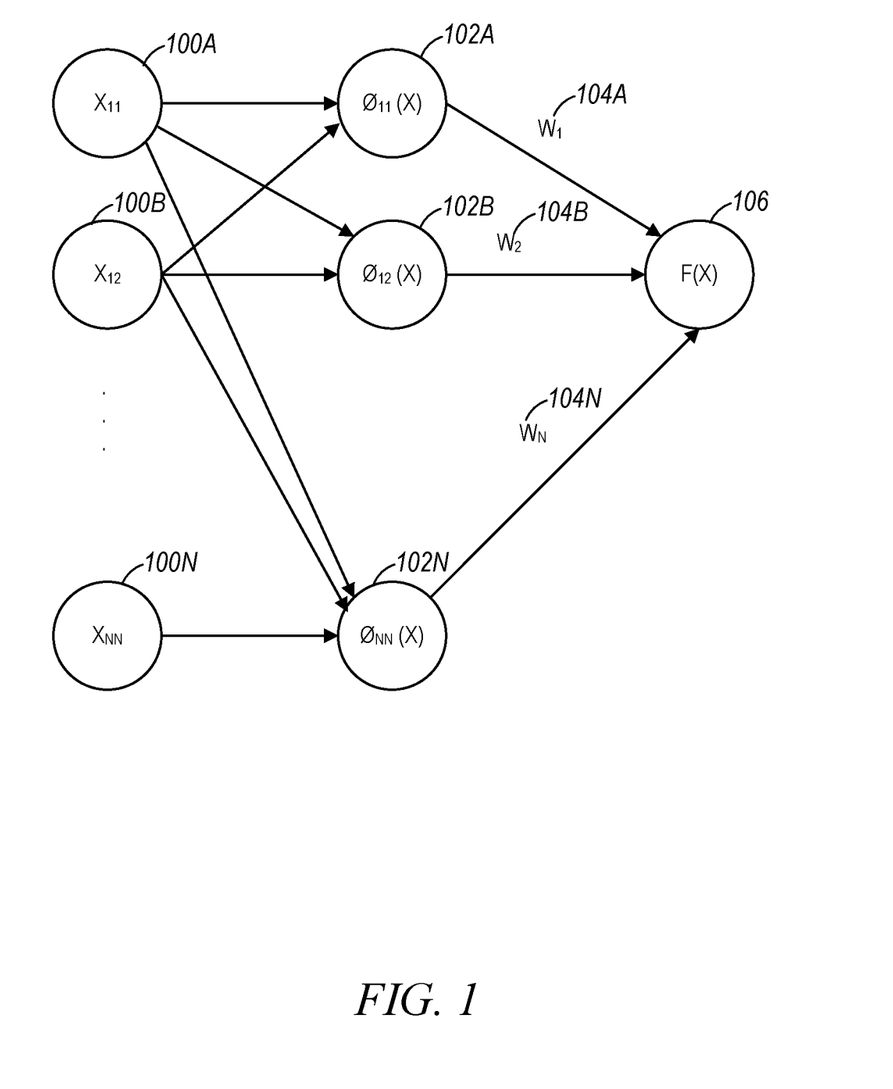
FIG. 1 is a graph diagram illustrating a downtime loss function, in accordance with an example embodiment.

FIG. 1 is a graph diagram illustrating a downtime loss function in accordance with an example embodiment. Here, each workload factor 100A-100N can be fed to various portions 102A-102N of a feature analyze layer, which may perform transformations/calculations, producing output, and this output, along with weights 104A-140N may be passed to the downtime loss function 106, which can these transformation/calculations (after the weights have been applied to (e.g., multiplied by) each transformation/calculation to produce a single downtime loss function output.

Figure 2:
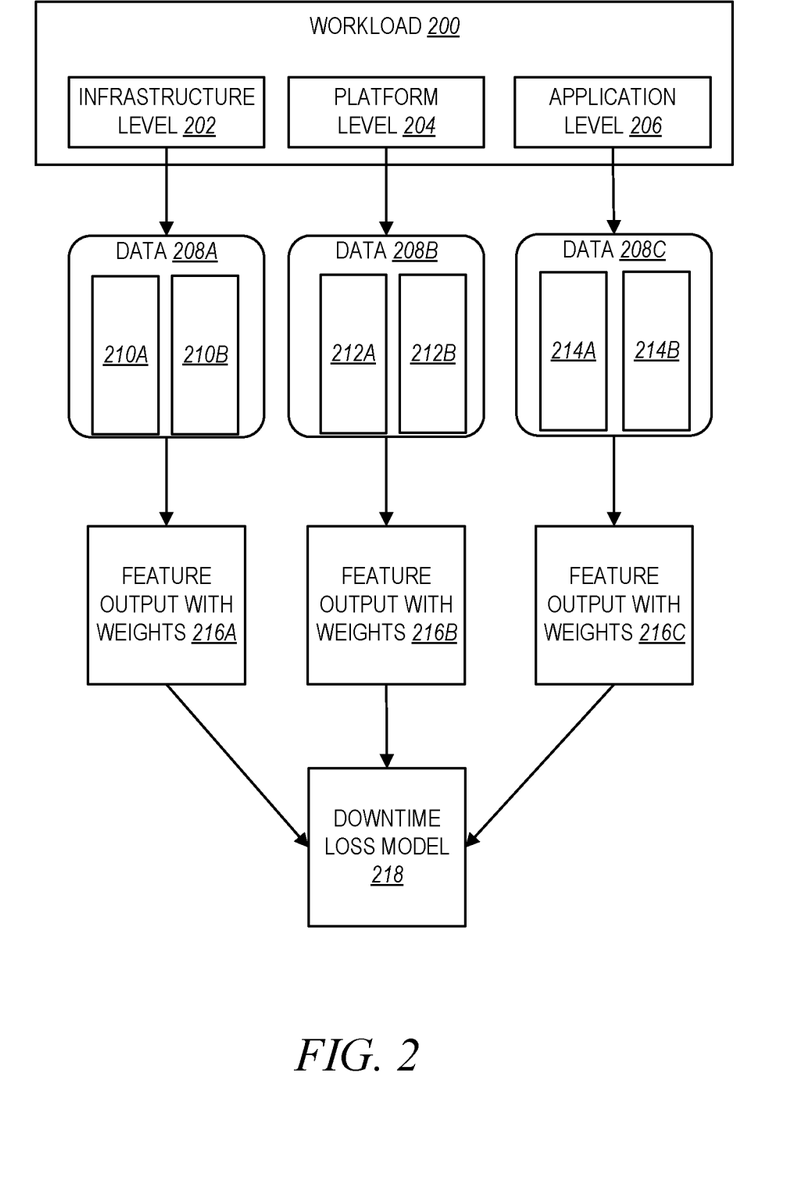
FIG. 2 is a diagram illustrating downtime loss influence factors on three levels, in accordance with an example embodiment.

FIG. 2 is a diagram illustrating downtime loss influence factors on three levels, in accordance with an example embodiment. More particularly, workload 200 may be measured at the infrastructure level 202, platform level 204, and application level 206. The data collected for each may be stored as depicted as data 208A, 208B, and 208C, respectively. The data 208A, 208B, 208C may be analyzed to extract one or more features 210A, 210B, 212A, 212B, 214A, 214B, each corresponding to a particular level 202, 204, 206. These features may be analyzed and possible transformed, as well as combined with weights, to produce feature outputs 216A, 216B, 216C. The features and weights may then be used by the downtime loss model 218 to make a prediction.

As mentioned above, the prediction model may be based on a multi-step forecasting time series model. Examples of multi-step forecasting time series models include Long Short-Term Memory (LSTM) and Deep Autoregressive (AR).

An LSTM network is a special type of Recurrent Neural Network (RNN). RNNs have loops in them, allowing information to persist. Specifically, information from an RNN is sent back to itself, so that over time the RNN is actually learning from itself. One of the appeals of RNNs is that they may be able to connect previous information to a present task. However, they can have trouble in making predictions based on non-recent information. For example, an RNN trained to predict the meaning of a last event in a long sequence may be able to accurately make that prediction based on the prior few events in the long sequence, but it may not perform well if the key to understanding the last word in the long sequence was the first event in the long sequence. As the gaps between words grow, RNNs become less able to connect the information.

The basic building block of an LSTM network is the LSTM cell, which consists of several components, including an input gate, a forget gate, an output gate, and a memory cell. The input gate controls the flow of information into the memory cell, while the forget gate controls the flow of information out of the memory cell. The output gate controls the flow of information from the memory cell to the next layer in the network.

An LTSM has four separate neural network layers interacting in a special way. The first layer is a sigmoid layer that decides which information to discard from the cell state. This layer decides what information to forget, such as forgetting the gender of a subject when a new subject is encountered in a sentence. The second layer is a sigmoid layer that decides which value to save in the cell. The third layer then actually updates the new cell state based on the decisions from the first and second layers. The fourth layer is another sigmoid layer that decides what will be output.

Deep AR is a type of neural network architecture used for time series forecasting and prediction. It is a variant of the autoregressive model, which is a statistical model used to analyze time-series data by predicting future values based on past values.

Deep AR uses a deep neural network architecture that can learn complex patterns and relationships in time series data, including seasonal and trend components. The network consists of several layers of densely connected nodes, with each node in a layer receiving input from all nodes in the previous layer. The architecture of Deep AR includes two main components: an encoder and a decoder. The encoder takes in the historical data and produces a hidden representation of it. The decoder then uses this representation to generate future predictions.

Regardless of the type of model, the multi-step forecasting time series model may consider holidays, weekends, day trends, seasonal trends and the like. More specifically, the multi-step forecasting time series model may have access to a calendar (either a built-in calendar or one provided by the user or designer). The calendar may indicate which dates are weekends/holidays, where the seasons fall, etc. This allows the multi-step forecasting time series model to account for variations that occur due to the holiday effect (e.g., lower traffic on holidays), weekend effect (e.g., lower traffic on weekends), day tends (e.g, lower traffic at night than during the day), and seasonal effects (e.g., lower traffic in summer than in spring).

The multi-step forecasting time series model is able to forecast downtime loss for a period in the future, and this future period can be used as the maintenance window to optimize the maintenance strategy.

Figure 3:
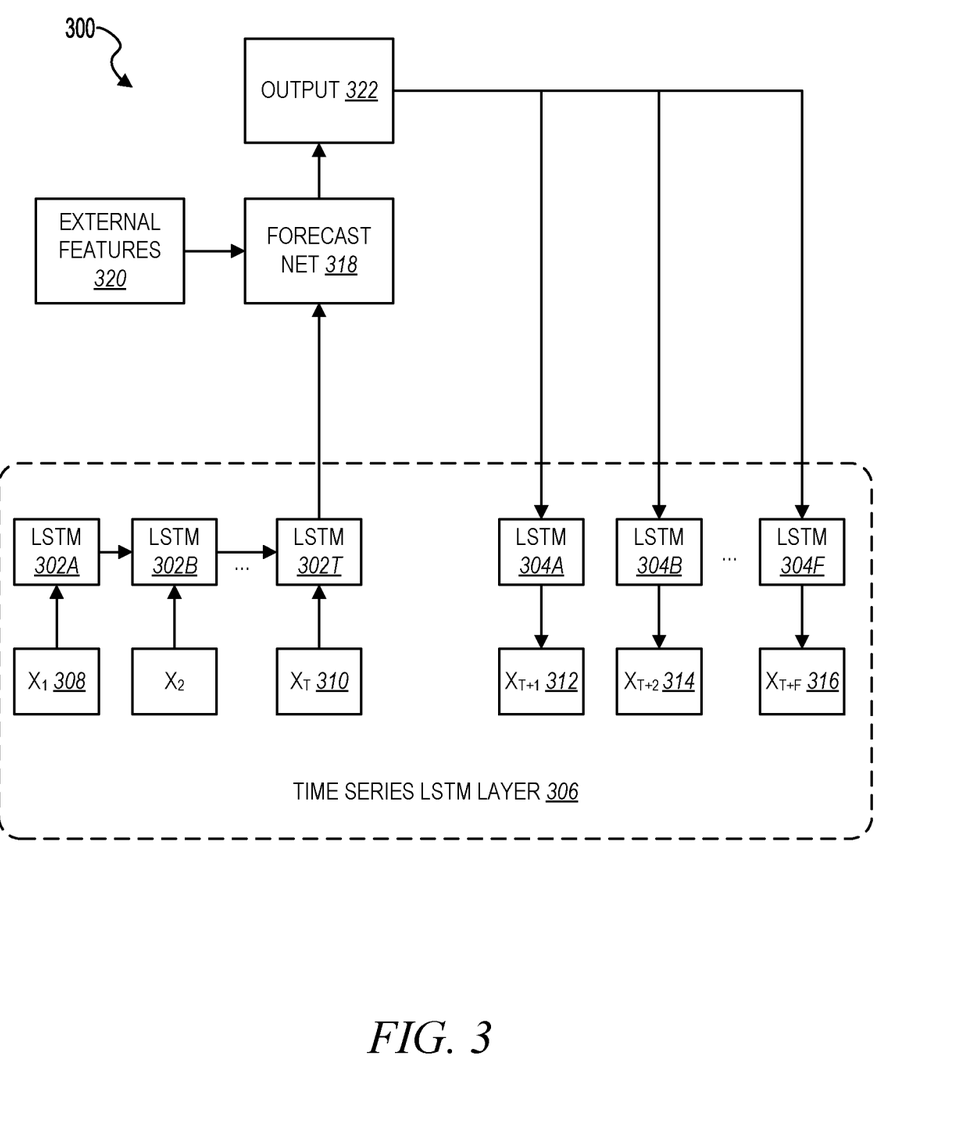
FIG. 3 is a block diagram illustrating a multi-step forecasting time series model in accordance with an example embodiment.

FIG. 3 is a block diagram illustrating a multi-step forecasting time series model 300 in accordance with an example embodiment. The multi-step forecasting time series model 300 includes a plurality of LSTMs 302A-302T and 304A-304F inside a time series LSTM layer 306. LSTMs 302A-302T are each designed to receive a different time series in the historical data (e.g., all the data up to the current time). Thus, as depicted here, LSTM 302A receives time series $X_1$ 308, while LSTM 302T receives time series $X_T$ 310. As a simple example, assume that each time series represents one day, with the historical data covering the past seven days. In such a case, T is 7, and there are seven LSTMs 302A-302T, each designed to receive a different day's historical data. It may be assumed that the current date is exactly between day 7 and day 8.

LSTMs 304A-304F are designed to are each designed to receive data output from prior LSTMs using a sliding window based on the length of the historical data (e.g., T=7 days). Each of the LSTMs 304A-304F are designed to predict future data for a future time period. Thus, in this example, LSTM 304A is designed to predict $X_{T-1}$ 312, (e.g. day 8) from the output of LSTMs 304A-304F associated with days 1-7. LSTM 304B is designed to predict $X_{T+2}$ 314, (e.g. day 9) from the output of LSTMs 304B-304F associated with days 2-7 and the output of LSTM 304A associated with day 8.

In this example, F represents the prediction step, which is the amount of time in the future to perform the prediction. Here, F is 7 days. As such, the multi-step forecasting time series model 300 is predicting data for the next 7 days based on the prior 7 days' data. Thus, LSTM 304F is designed to predict $X_{T+F}$ 316, (e.g., day 14) from the output of LSTMs 304F associated with day 7 and the output of LSTMs 304A-304G, associated with days 8-13.

To accomplish this, the output of LSTMs 302A-302T is passed to a forecast net 318, which uses external features 320 to aid in the production of output 322 relevant to the future prediction of the data. In this case, the external features 320 may include, for example, holiday trends, special days, weekend/weekday trends, etc.

Microservices are small, independent software processes that can be written in multiple languages. An infrastructure designed for these modular components is known as a microservices environment or microservices architecture. Cloud environments may be used to implement microservices environments. An example of a microservices environment is SAP Business Technology Platform (BTP), from SAP SE of Walldorf, Germany.

SAP Data Intelligence, from SAP SE of Walldorf, Germany, is a cloud-based platform offered by SAP that provides a comprehensive solution for data management, data processing, and machine learning. It enables organizations to connect to various data sources, integrate data from different systems, and use advanced analytics to gain insights and make informed decisions.

The platform provides a range of tools and capabilities for data integration, transformation, and governance, including data quality and data lineage. It also offers machine learning features, such as automated model building, model selection, and deployment.

With SAP Data Intelligence, businesses can create end-to-end data pipelines, from data ingestion to data analysis and visualization, all in a secure and scalable environment.

SAP Data Intelligence is exposed to its users through SAP BTP, but SAP Data Intelligence evolves rapidly, necessitating frequent upgrades. Since these upgrades usually are related to data structure changes and data migration, it is technically challenging to implement zero down-time updates. Thus, maintenance windows are used, which affect system usage. During the maintenance windows, all of the system loads are interrupted, and all the jobs will break off and have their corresponding services unavailable. As such, in an example embodiment, the described multi-step forecasting time series model may be used to predict a maintenance window for a customer of SAP Data Intelligence. This prediction provides an estimate of the best maintenance window to minimize downtime loss to the customer. This prediction is based on the data collected when the system was running previously.

In a further example embodiment, the multi-step forecasting time series model is implemented in a Data Hub as a Service (DHaaS), which is a cloud-based service that allows organizations to collect, store, and analyze large amounts of data from various sources in real-time. The DHaaS may be implemented in a container-orchestration system, such as Kubernetes™. Container-orchestration systems, such as Kubernetes™ can be used to deploy, scale, and manage computer applications. In a container-orchestration system, an operator is a software component that handles lifecycle events of stateful applications. Thus, in an example embodiment, a specialized operator may be created that implements the multi-step forecasting time series model to make predictions about maintenance windows for SAP Data Intelligence customers.

Figure 4:
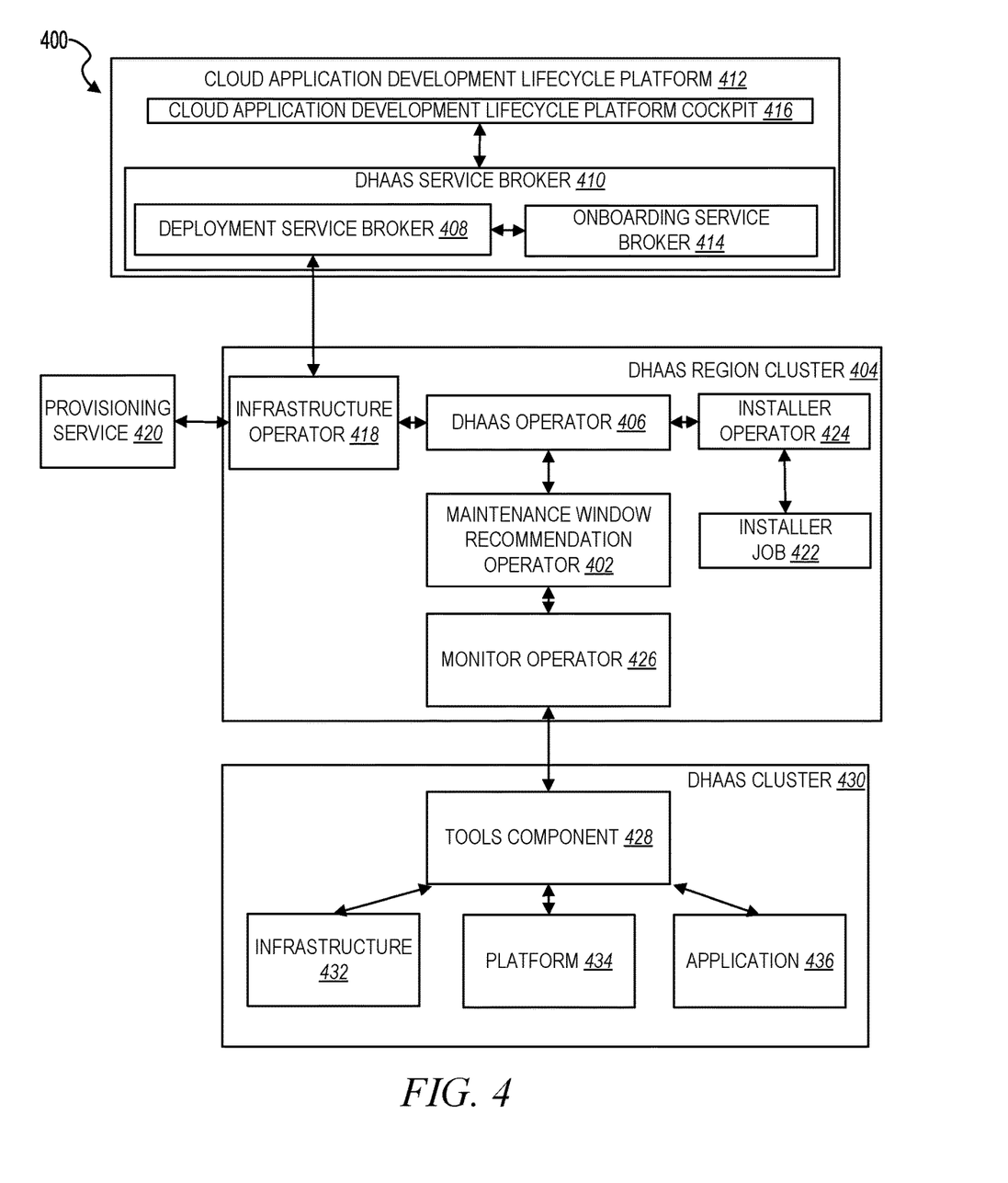
FIG. 4 is a block diagram illustrating a system including a maintenance window recommendation operator implementing a multi-step forecasting time series model in accordance with an example embodiment.

FIG. 4 is a block diagram illustrating a system 400 including a maintenance window recommendation operator 402 implementing a multi-step forecasting time series model in accordance with an example embodiment. The maintenance window recommendation operator 402 is implemented within a DHaaS region cluster 404 implemented using Kubernetes™. The DHaaS region cluster further includes a DHaaS operator 406, which is invoked by a deployment service broker 408 in a DHaaS service broker 410 in a cloud application development lifecycle platform 412, such as Cloud Foundry™. Cloud Foundry™ is an open source, multi-cloud application platform service that allows for continuous delivery as it supports a full application development lifecycle, from initial deployment through testing stages to deployment. Cloud Foundry™ utilizes a container-based architecture that runs applications in any programming language over a variety of cloud service providers. The deployment service broker 408 may connect to an onboarding service broker 414 and be controlled by cloud application development lifecycle platform cockpit 416.

The DHaaS operator 406 creates and polls an infrastructure operator 418, which itself can poll states and call application program interfaces (APIs) in a provisioning service 420. The DHaaS operator 406 also acts to cause installation of an installer job 422 using an installer operator 424.

In order to make its maintenance window recommendation, the maintenance window recommendation operator 402 needs data about the customer's platform, which it can obtain from a monitor operator 426. The monitor operator 426 obtains report metrics from a tools component 428 within a separate DHaaS cluster 430. The tools component 428 tracks and monitors infrastructure 432 performance, platform 434 performance, and application 436 performance of the customer's system. This performance data can include, for example, CPU utilization, memory usage, network I/O, and the number of user connections.

With the user's permission, the maintenance window recommendation operator 402 can collect user data, such as the type of the user's business, dates the user prefers not to perform maintenance, the scale of infrastructure hardware, the number of tenants, etc. According to the user data, a specific pre-defined downtime loss cost function can be selected. Data about the factors utilized by this specific pre-defined downtime loss cost function can then be obtained from the tools component 428.

The following is an example Javascript™ Object Notation (JSON) file that can be used as an input parameter in an example embodiment: [{"start": "2021-09-20 12:00:00", "dynamic_feat": [0.87, 0.35, 0.78]}, [{"start": "2021-09-20 13:00:00", "dynamic_feat": [0.67, 0.55, 0.31]}] where 'start' is the time series, 'dynamic_feat' is the downtime loss cost parameter. This example refers to the average CPU utilization, the average memory usage, and network I/O in the brackets.

A prediction step can then be defined by specifying a prediction period (the amount of time in the future to predict maintenance windows, such as seven days). This is just an example, however. Users should consider not only the impact of the prediction period on the model accuracy, but also the constraints of their own system.

The multi-step forecasting time series model then predicts a recommended maintenance window by collecting the historical time series data, which is used to train the multi-step forecasting time series model, and then it can predict the maintenance window for the upcoming prediction period. In some example embodiment, the historical data goes back the same amount of time as the prediction period goes forward (e.g., seven days, which essentially creates a sliding fourteen day window until the downtime loss at all time points in the next seven days are predicted.

In an example embodiment, the selection of a particular maintenance window is a multi-step process. In the first step, the future time series data relevant to the downtime loss is predicted, as described above with respect to FIG. 3. Thus, for example, each of the next 7 day's time series data related to, for example, various types of workloads are predicted. These are time series, however, and thus it is not as if there is a single workload value for the entire day. Rather, the time series prediction for any particular day will reflect predicted ebb and flow of various types of workload during that particular day. At the end of the first step, a particular day from the future predicted days is selected as the best day from which the maintenance window is to be selected. This may be based on, for example, finding the day that minimizes the average downtime loss across the entire day.

Figure 5:
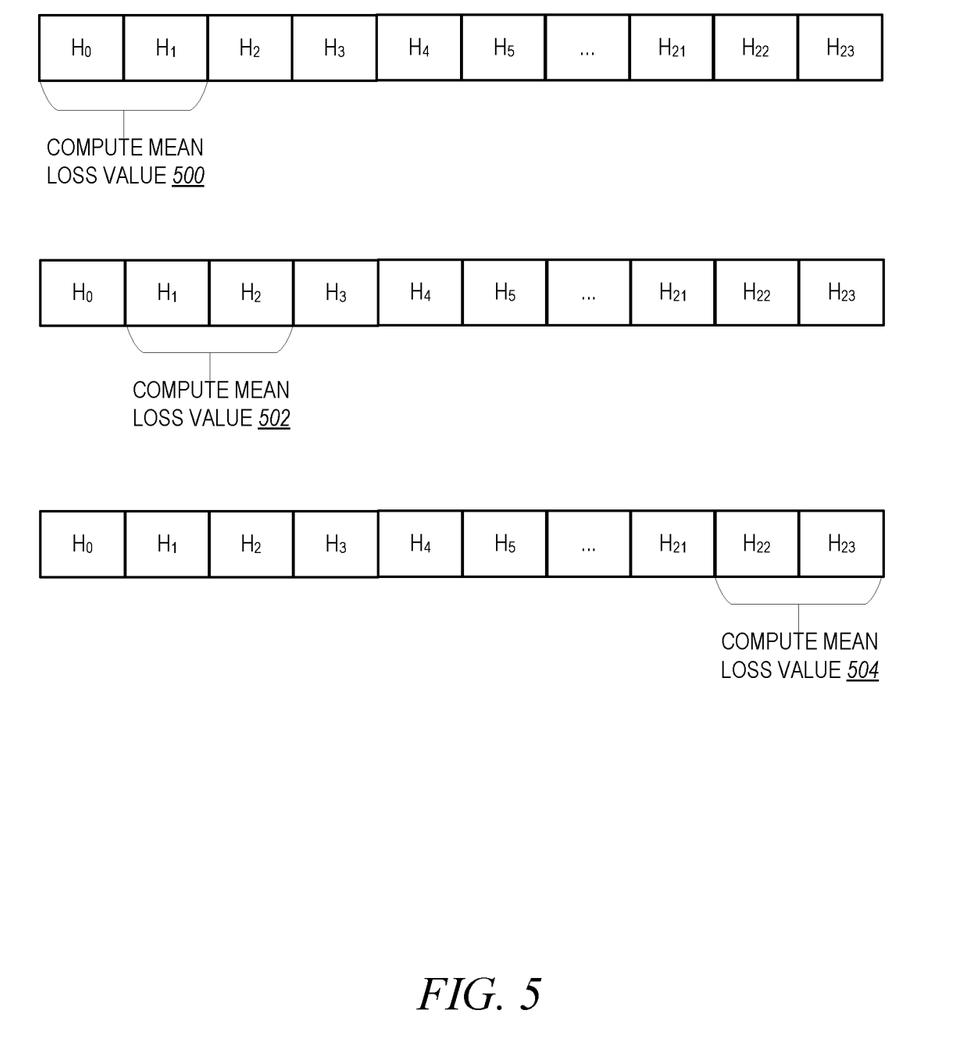
FIG. 5 is a diagram illustrating the calculation of means of downtime loss across different two-hour periods, in accordance with an example embodiment.

In the second step, the selected day's predicted time series day is drilled in on and a particular maintenance window of a predetermined length (e.g., two hours) is selected. This may be based on the average downtime loss across each two hour period in the selected day. FIG. 5 is a diagram illustrating the calculation of means of downtime loss across different two-hour periods, in accordance with an example embodiment. As can be seen, the mean of the first two hours' downtime loss is computed at 500, then the mean of the second and third hours' downtime loss is computed at 502, and so on until the mean of the last two hours' downtime loss is computed at 504. The two hour window with the lowest mean downtime loss can then be selected as a recommended maintenance window.

It should be noted that this two-step process is optional. In some example embodiments, the second step may simply be performed on all the predicted future data at once (e.g., each two hour window for the next 7 days' time series data is examined), without the need to select a day first.

It should also be noted that the daytime and hour time periods are merely examples. In actuality, any length of time can be used, and in the two-step, process described above, the first selected time length period in the first step simply needs to be longer than the second selected time length period in the second step.

Figure 6:
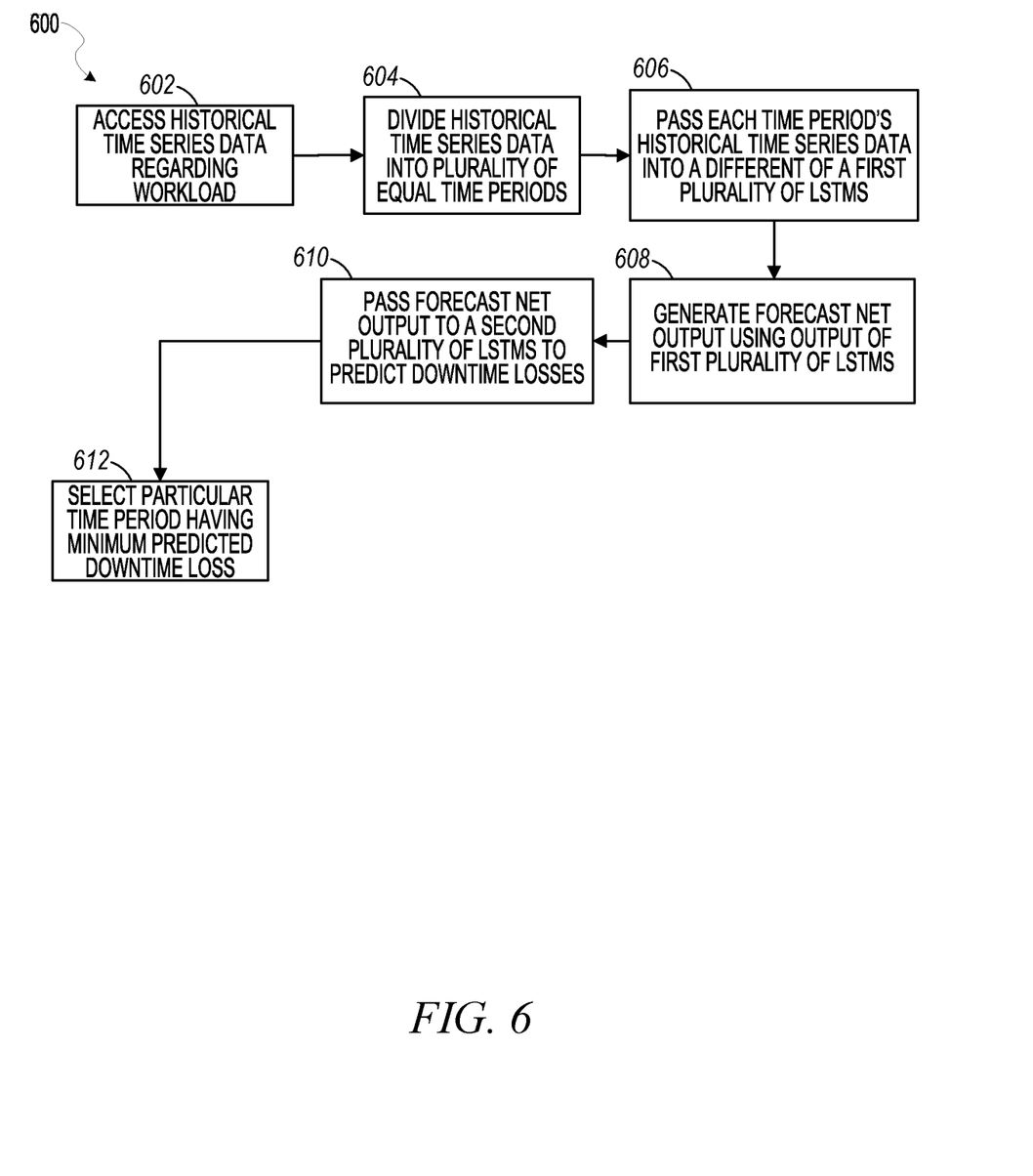
FIG. 6 is a flow diagram illustrating a method, in accordance with an example embodiment.

FIG. 6 is a flow diagram illustrating a method 600, in accordance with an example embodiment. At operation 602, historical time series data regarding workload of a first computer service is accessed. In an example embodiment, this historical time series data may be obtained from a monitor operator in a container in a container-based orchestration system, such as Kubernetes™. In an example embodiment, the workload includes more than one type of workload, such as infrastructure level workload, platform level workload, and application level workload.

At operation 604, the historical time series data is divided into a plurality of equal time periods of a first length. At operation, 606, each of the time period's historical time series data is passed into a different of a first plurality of long short-term memories (LSTMs), generating output to a forecast net. At operation 608, forecast net output is generated at the forecast net using the output regarding downtime loss from the first plurality of LSTMs.

At operation 610, the forecast net output is passed to a second plurality of LSTMs, each of the second plurality of LSTMs outputting a prediction of a different future period's downtime loss. The downtime loss is a function reflecting a potential lost value for loss of functioning of the first computer service during a particular time period.

At operation 612, a particular different future time period, having a minimum predicted downtime loss of the different future time period is automatically selected. It should be noted that the term "selected" in this context does not necessarily mean that this selected future time period (e.g., maintenance window) will actually be used as the selection for a maintenance window to actually use for maintenance. The selection may be a selection of which maintenance window to recommend to a user, allowing the user to make the final determination of whether or not to accept this recommendation.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
accessing historical time series data regarding workload of a first computer service;
dividing the historical time series data into a plurality of equal time periods of a first length;
passing the historical time series data of each of the plurality of time periods into a different long short-term memory of a first plurality of long short-term memories (LSTMs), to generate a first output;
using the first output from the LSTMs, at a forecast net, to generate a second output, the second output including downtime loss, wherein the downtime loss is a function reflecting a potential lost value for loss of functioning of the first computer service during a particular time period of the plurality of time periods;
passing the second output to a second plurality of LSTMs, each of the second plurality of LSTMs outputting a prediction of a downtime loss for each of a plurality of different future time periods; and
automatically selecting a particular different future time period having a minimum predicted downtime loss of the plurality of different future time periods.

Example 2. The system of Example 1, wherein the automatically selecting causes a maintenance window covering the particular different future time period to be recommended to a user.

Example 3. The system of Examples 1 or 2, wherein the historical time series data regarding workload includes more than one type of workload.

Example 4. The system of Example 3, wherein the more than one type of workload includes infrastructure level workload, platform level workload, and application level workload.

Example 5. The system of any of Examples 1-4, wherein the operations are performed within a maintenance window recommendation operator in a container in a container-based orchestration system.

Example 6. The system of Example 5, wherein the historical time series data is collected by a monitor operator in the container.

Example 7. The system of Example 5, wherein the container is contained within a Data Historian as a Service (DHaaS) region cluster.

Example 8. A method comprising:
accessing historical time series data regarding workload of a first computer service;
dividing the historical time series data into a plurality of equal time periods of a first length;
passing the historical time series data of each of the plurality of time periods into a different long short-term memory of a first plurality of long short-term memories (LSTMs), to generate a first output;
using the first output from the LSTMs, at a forecast net, to generate a second output, the second output including downtime loss, wherein the downtime loss is a function reflecting a potential lost value for loss of functioning of the first computer service during a particular time period of the plurality of time periods;
passing the second output to a second plurality of LSTMs, each of the second plurality of LSTMs outputting a prediction of a downtime loss for each of a plurality of different future time periods; and
automatically selecting a particular different future time period having a minimum predicted downtime loss of the plurality of different future time periods.

Example 9. The method Example 8, wherein the automatically selecting causes a maintenance window covering the particular different future time period to be recommended to a user.

Example 10. The method of Examples 8 or 9, wherein the historical time series data regarding workload includes more than one type of workload.

Example 11. The method of Example 10, wherein the more than one type of workload includes infrastructure level workload, platform level workload, and application level workload.

Example 12. The method of any of Examples 8-11, wherein the method is performed within a maintenance window recommendation operator in a container in a container-based orchestration system.

Example 13. The method of Example 12, wherein the historical time series data is collected by a monitor operator in the container.

Example 14. The method of Example 12, wherein the container is contained within a Data Historian as a Service (DHaaS) region cluster.

Example 15. A non-transitory machine-readable medium storing instructions which, when executed by one or more processors, cause the one or more processors to perform operations comprising:
accessing historical time series data regarding workload of a first computer service;
dividing the historical time series data into a plurality of equal time periods of a first length;
passing the historical time series data of each of the plurality of time periods into a different long short-term memory of a first plurality of long short-term memories (LSTMs), to generate a first output;
using the first output from the LSTMs, at a forecast net, to generate a second output, the second output including downtime loss, wherein the downtime loss is a function reflecting a potential lost value for loss of functioning of the first computer service during a particular time period of the plurality of time periods;
passing the second output to a second plurality of LSTMs, each of the second plurality of LSTMs outputting a prediction of a downtime loss for each of a plurality of different future time periods; and
automatically selecting a particular different future time period having a minimum predicted downtime loss of the plurality of different future time periods.

Example 16. The non-transitory machine-readable medium of Example 15, wherein the automatically selecting causes a maintenance window covering the particular different future time period to be recommended to a user.

Example 17. The non-transitory machine-readable medium of Examples 15 or 16, wherein the historical time series data regarding workload includes more than one type of workload.

Example 18. The non-transitory machine-readable medium of Example 17, wherein the more than one type of workload includes infrastructure level workload, platform level workload, and application level workload.

Example 19. The non-transitory machine-readable medium of any of Examples 15-18, wherein the operations are performed within a maintenance window recommendation operator in a container in a container-based orchestration system.

Example 20. The non-transitory machine-readable medium of Example 19, wherein the historical time series data is collected by a monitor operator in the container.

Figure 7:
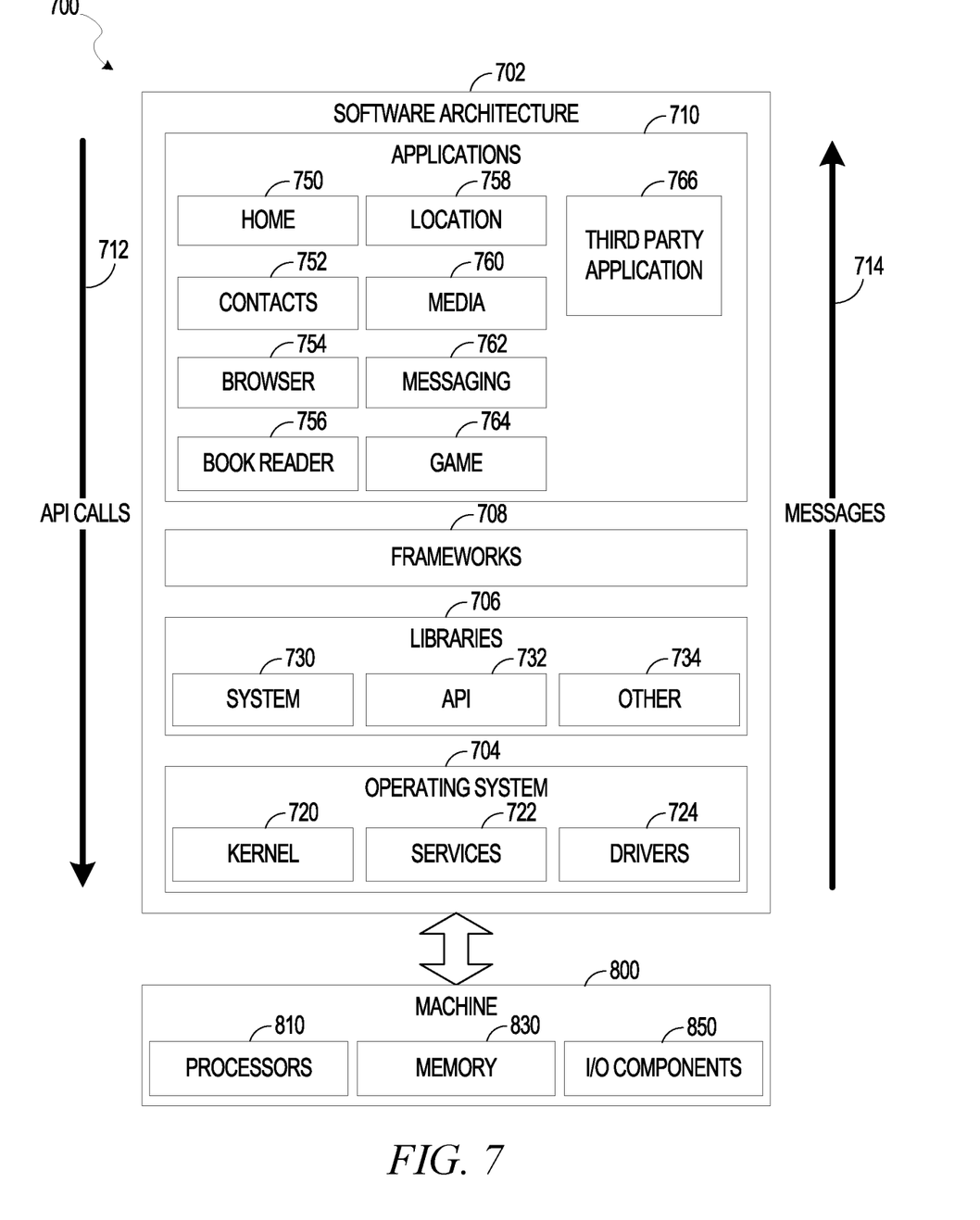
FIG. 7 is a block diagram illustrating an architecture of software, which can be installed on any one or more of the devices described above.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionalities. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphical user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
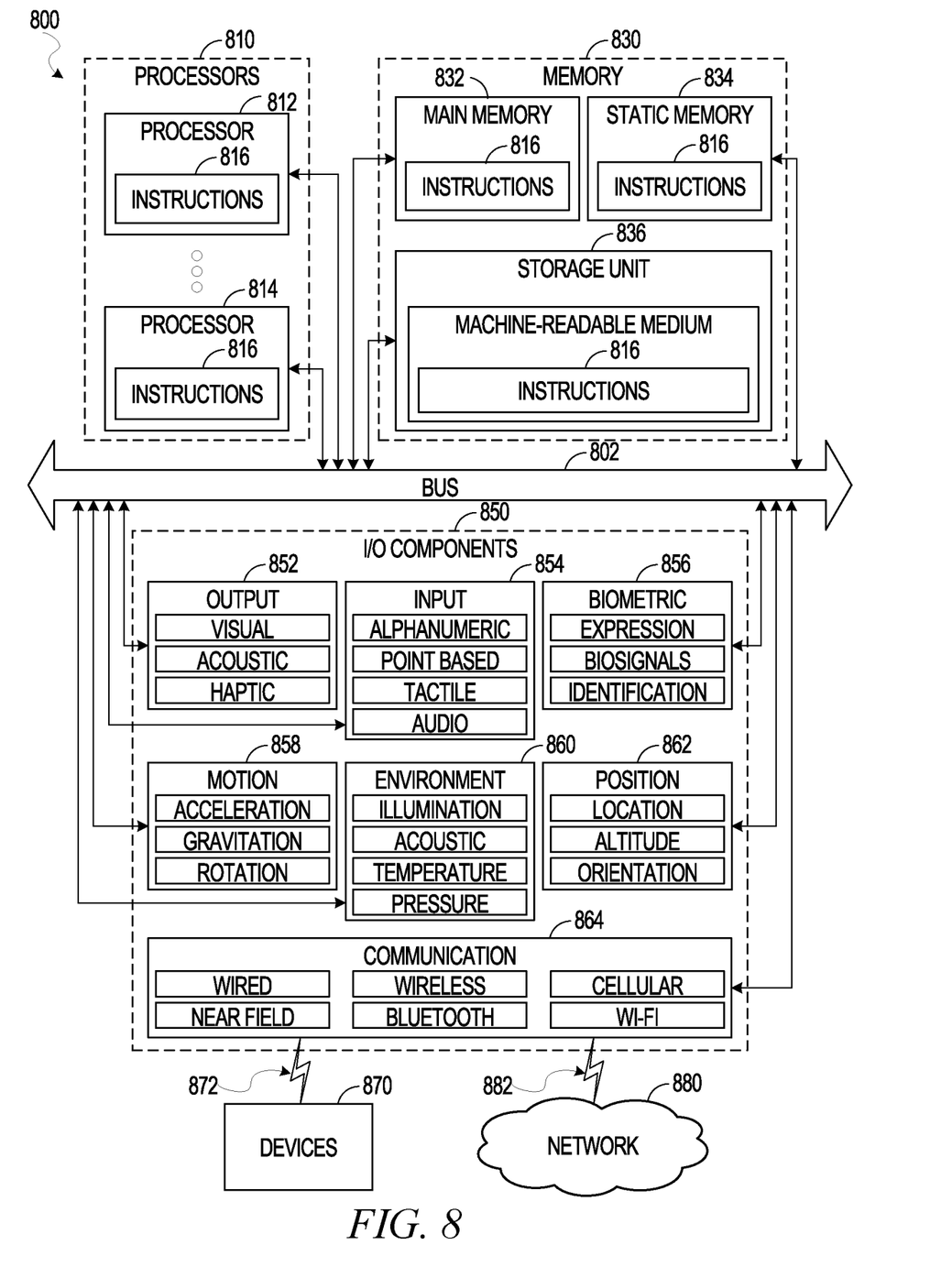
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute the method of FIG. 6. Additionally, or alternatively, the instructions 816 may implement FIGS. 1-6 and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor 812 with a single core, a single processor 812 with multiple cores (e.g., a multi-core processor 812), multiple processors 812, 814 with a single core, multiple processors 812, 814 with multiple cores, or any combination thereof.

The memory 830 may include a main memory 832, a static memory 834, and a storage unit 836, each accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., coupled via a USB).

Moreover, the communication components 864 may detect identifiers or include components operable to detect identifiers. For example, the communication components 864 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

The various memories (e.g., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., Hypertext Transfer Protocol [HTTP]). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   accessing historical time series data regarding workload of a first computer service;
   dividing the historical time series data into a plurality of equal time periods of a first length;
   passing the historical time series data of each of the plurality of time periods into a different long short-term memory of a first plurality of long short-term memories (LSTMs), to generate a first output;
   using the first output from the LSTMs, at a forecast net, to generate a second output, the second output including downtime loss, wherein the downtime loss is a function reflecting a potential lost value for loss of functioning of the first computer service during a particular time period of the plurality of time periods;
   passing the second output to a second plurality of LSTMs, each of the second plurality of LSTMs outputting a prediction of a downtime loss for each of a plurality of different future time periods; and
   automatically selecting a particular different future time period having a minimum predicted downtime loss of the plurality of different future time periods.

2. The system of claim 1, wherein the automatically selecting causes a maintenance window covering the particular different future time period to be recommended to a user.

3. The system of claim 1, wherein the historical time series data regarding workload includes more than one type of workload.

4. The system of claim 3, wherein the more than one type of workload includes infrastructure level workload, platform level workload, and application level workload.

5. The system of claim 1, wherein the operations are performed within a maintenance window recommendation operator in a container in a container-based orchestration system.

6. The system of claim 5, wherein the historical time series data is collected by a monitor operator in the container.

7. The system of claim 5, wherein the container is contained within a Data Historian as a Service (DHaaS) region cluster.

8. A method comprising:
accessing historical time series data regarding workload of a first computer service;
dividing the historical time series data into a plurality of equal time periods of a first length;
passing the historical time series data of each of the plurality of time periods into a different long short-term memory of a first plurality of long short-term memories (LSTMs), to generate a first output;
using the first output from the LSTMs, at a forecast net, to generate a second output, the second output including downtime loss, wherein the downtime loss is a function reflecting a potential lost value for loss of functioning of the first computer service during a particular time period of the plurality of time periods;
passing the second output to a second plurality of LSTMs, each of the second plurality of LSTMs outputting a prediction of a downtime loss for each of a plurality of different future time periods; and
automatically selecting a particular different future time period having a minimum predicted downtime loss of the plurality of different future time periods.

9. The method of claim 8, wherein the automatically selecting causes a maintenance window covering the particular different future time period to be recommended to a user.

10. The method of claim 8, wherein the historical time series data regarding workload includes more than one type of workload.

11. The method of claim 10, wherein the more than one type of workload includes infrastructure level workload, platform level workload, and application level workload.

12. The method of claim 8, wherein the method is performed within a maintenance window recommendation operator in a container in a container-based orchestration system.

13. The method of claim 12, wherein the historical time series data is collected by a monitor operator in the container.

14. The method of claim 12, wherein the container is contained within a Data Historian as a Service (DHaaS) region cluster.

15. A non-transitory machine-readable medium storing instructions which, when executed by one or more processors, cause the one or more processors to perform operations comprising:
accessing historical time series data regarding workload of a first computer service;
dividing the historical time series data into a plurality of equal time periods of a first length;
passing the historical time series data of each of the plurality of time periods into a different long short-term memory of a first plurality of long short-term memories (LSTMs), to generate a first output;
using the first output from the LSTMs, at a forecast net, to generate a second output, the second output including downtime loss, wherein the downtime loss is a function reflecting a potential lost value for loss of functioning of the first computer service during a particular time period of the plurality of time periods;
passing the second output to a second plurality of LSTMs, each of the second plurality of LSTMs outputting a prediction of a downtime loss for each of a plurality of different future time periods; and
automatically selecting a particular different future time period having a minimum predicted downtime loss of the plurality of different future time periods.

16. The non-transitory machine-readable medium of claim 15, wherein the automatically selecting causes a maintenance window covering the particular different future time period to be recommended to a user.

17. The non-transitory machine-readable medium of claim 15, wherein the historical time series data regarding workload includes more than one type of workload.

18. The non-transitory machine-readable medium of claim 17, wherein the more than one type of workload includes infrastructure level workload, platform level workload, and application level workload.

19. The non-transitory machine-readable medium of claim 15, wherein the operations are performed within a maintenance window recommendation operator in a container in a container-based orchestration system.

20. The non-transitory machine-readable medium of claim 19, wherein the historical time series data is collected by a monitor operator in the container.

* * * * *